(12) United States Patent
Clift

(10) Patent No.: US 6,598,149 B1
(45) Date of Patent: Jul. 22, 2003

(54) PERFORMANCE ENHANCEMENT FOR CODE TRANSITIONS OF FLOATING POINT AND PACKED DATA MODES

(75) Inventor: David Wayne Clift, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,631

(22) Filed: Mar. 31, 2000

(51) Int. Cl.$^7$ ................................................ G06F 9/44
(52) U.S. Cl. ...................... 712/222; 710/262; 712/229
(58) Field of Search .......................... 710/262; 712/222, 712/229

(56) References Cited

U.S. PATENT DOCUMENTS 5,255,379 A * 10/1993 Melo ........................... 711/202
5,835,748 A * 11/1998 Orenstein et al. ........... 712/217
6,173,394 B1 * 1/2001 Guttag et al. ................ 712/226

* cited by examiner

Primary Examiner—Kenneth S. Kim
(74) Attorney, Agent, or Firm—Blakely, Sokoloff, Taylor & Zafman LLP

(57) ABSTRACT

A technique for enhancing performance for code transitions of floating point and packed data modes, in which a tag incorrect (TINC) bit is used to indicate a potential fault condition when transitioning between the modes. When tags of a floating point/packed data registers are not at the expected value for the mode transition, the TINC bit is used to a substitute condition which prevents the generation of the fault condition.

30 Claims, 3 Drawing Sheets

PERFORMANCE ENHANCEMENT FOR CODE TRANSITIONS OF FLOATING POINT AND PACKED DATA MODES

BACKGROUND OF THE INVENTION

1. Field of the Invention

The present invention relates to the field of computer systems and more specifically to enhancing performance when performing code transitions of data operating modes.

2. Description of the Related Art

In a computer system, a processor typically operates on data which is in one of several data modes, having different formats. For example, an execution unit of a processor may operate on integer data or it may operate on a floating point data. Generally, floating point operations are utilized when higher precision results are desired. Floating point data is represented in a different format than integer data.

Since integer and floating point operations utilize different data representations, in many state of the art processors, separate structures are allocated to execute integer and floating point instructions. This difference includes the use of separate registers for integer and floating point data. The operation of separate integer and floating units within a processor, as well as the execution of the floating point and integer instructions to operate on these types of data formats, are known in the art.

More recently, processors are designed to execute instructions which operate on another type of data format. This new type of data format is termed packed data. Instead of performing scalar operations, packed data operations are designed to operate on packed data. Although separate structures can be designed within a processor to perform the packed data operations, a more common practice is to alias packed data registers on floating point registers. That is, the floating point instructions and the packed data instructions at least appear to software to be executed on the same set of logical registers within a processor. A variety of techniques can be used to implement this aliasing scheme of floating point and packed data, and one such example is described in U.S. Pat. No. 5,835,748.

An example of a processor which implements aliasing of floating point and packed data is a processor within the Intel Architecture Family of Processors, which includes the Pentium® processor, manufactured by Intel Corporation of Santa Clara, Calif. In one particular approach, the floating point operating registers of the processor is also utilized to perform packed data operations. The same logical registers are utilized to perform both scalar floating point and packed data operations. The instructions that manipulate the two types of data in these registers are significantly different. The floating point instructions perform floating point scalar operations and packed data instructions perform packed data operations.

With the Intel Architecture Family described above, the aliasing requires the use of a special set of tags which correspond to data stored within the data registers. In the floating point mode, the tags are used to identify which of the registers contain a valid floating point word. When a floating point operation is to be executed, the processor enters into a floating point operative state in which the registers are treated as floating point registers for executing the instruction. However, when the processor operates in the packed data operative state, the data stored in the floating point registers must now conform to the operating parameters established for executing a packed data instruction. Since the data formats are different for packed data and floating point data formats, a typical practice is to implement a data flush and load new data when the operating mode switches between floating point and packed data operations.

This may not be a significant concern if the processor operates for an extended period of time in a given mode of operation before transitioning to the other mode. However, when a substantial amount of mixed mode operation is to be performed, the processor is forced to flush the data pipeline to switch from one format mode to another. This constant switching between modes results in significant processor time being wasted in continually reinitiating the registers to execute the different instruction set. The present invention describes one scheme in which performance is enhanced when such mixed mode operations are desired.

DETAILED DESCRIPTION OF THE INVENTION

Figure 1:
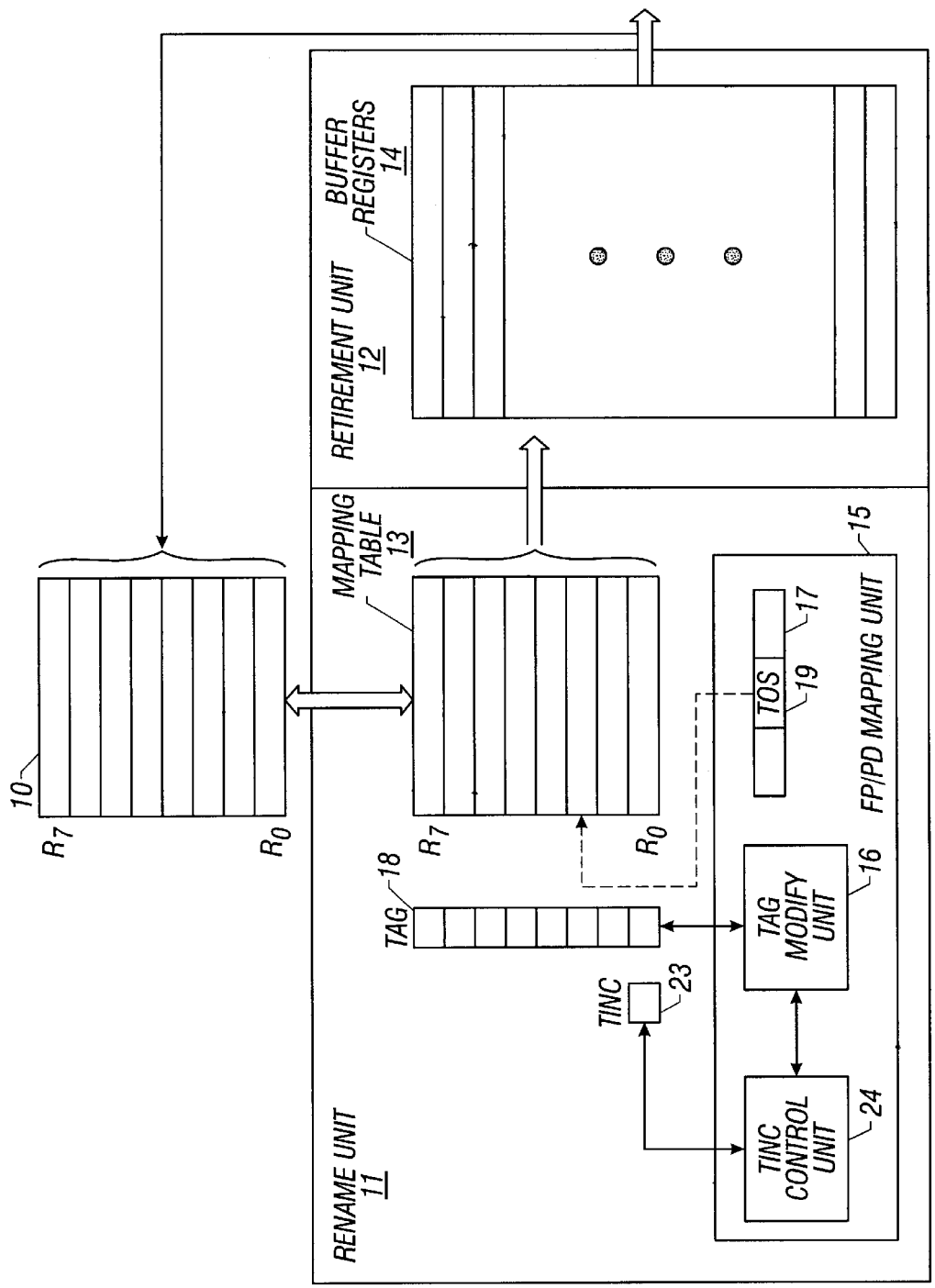
FIG. 1 is a block schematic diagram showing the floating point/packed data registers, their tags and use of a tag status (TINC) bit to minimize fault conditions when transitioning between floating point and packed data modes.

Referring to FIG. 1, a block diagram illustrates a structure for utilizing a particular register set for both floating point and packed data operations. In the particular example shown in FIG. 1, eight logical registers (individually designated as registers R0–R7) are coupled to a rename unit 11. The logical registers 10 correspond to those registers typically specified in an instruction set, such as the instruction set corresponding to the Intel Architecture Family of Processors. The logical registers 10 are utilized for providing data storage on floating point data and packed data.

The rename unit 11 includes a mapping table 13 for mapping the logical registers 10 to physical locations within buffer registers 14, which are located within a retirement unit 12. The rename unit 11 functions to rename the logical registers to different buffer registers 14 so that different instructions specifying the same logical register can still be executed without a conflict. The mapping table 13 provides the mapping of a specified logical register to an available buffer register 14. The buffer registers 14 function as physical registers when the logical registers 10 are renamed by the mapping table 13. It is appreciated that the mapping of logical registers to physical registers by the use of a mapping table and a rename unit is known in the art. The aforementioned U.S. Pat. No. 5,835,748 exemplifies one known technique for performing the mapping of the logical register to a physical register. Thus, the rename unit 11 and the retirement unit 12 can be used to implement register renaming to avoid data storage conflicts resulting from different instructions attempting to use the register set R0–R7.

Accordingly, data specified within a given register, such as register R7, in one context would be stored in one physical location with the buffer registers 14, but another data specifying the same register in another context would be stored in a separate location within buffer register 14. The renaming, which maps the same logical register to separate physical registers, is performed by the rename unit 11.

In the particular example of FIG. 1, registers 10 are floating point registers which are aliased to also operate on packed data. Thus, registers 10 are used to operate on floating point data or packed data, depending on the mode of operation of the processor. Thus, the mode of the processor operation determines how the data within the registers 10 are operated upon. The buffer registers 14 are utilized as physical registers and provide the output when a particular operation is to be retired. The retirement can be output to one or more set of architectural registers, as shown in U.S. Pat. No. 5,835,748, or written out directly from the buffer registers 14. The manner in how the data stored in buffer registers 14 is retired is not critical to the understanding of this invention.

The rename unit 11 also includes a floating point/packed data (FP/PD) mapping unit 15, which includes a tag modify unit 16 and a status register 17. Also associated with the mapping table 13 are the tags 18. At least one tagged bit is associated with each of the registers R0–R7 such that the combined tags provide a TAGWORD to note the status of the respective registers R0–R7.

The mapping unit 15 controls the renaming performed in the mapping table 13, as well as the setting or resetting of the bit or bits of each tag 18. As shown in the example of FIG. 1 each of the entries in the mapping table 13 correspond to a logical register 10. In the particular example, the floating point registers operate as a stack such that the status register includes a top of stack (TOS) identifier 19 to designate which one of the registers is at the top of the stack. So far, the above description identifies those structures which function equivalently to similar designated structures described in U.S. Pat. No. 5,835,748.

When the floating point registers R0–R7 operate on floating point data, the TOS entry 19 identifies which register is at the top of the stack. Furthermore, the tag 18 identifies if a given table entry is full or empty. Assuming a one bit tag in the example, if a floating point data is present in register R7 for example, then the tagged bit associated with register R7 contains a bit value, such as "1". If a particular register is empty then the respective tag bit would have a "0" value. Thus, the TAGWORD identifies which of the floating point registers contain data. In the scalar floating point mode, the tags are used to identify those registers which contain floating point data. In this particular example, a stack is considered full when the TAGWORD is comprised of all 1s.

It is appreciated that the floating point registers R0–R7 can be aliased to contain packed data when packed data instructions are being executed by the processor. Again, one such technique of aliasing floating point and packed data within a given register set is described in the aforementioned U.S. Pat. No. 5,835,748. However, when an instruction set operating under the Intel Architecture Family is utilized, packed data instructions (such as the instructions pertaining to MMX™ Technology) require that all of the tag bits be set to represent a full stack. That is, when packed data instructions overlay some or all of the registers R0–R9, by architectural definition, any such packed data instruction causes the tag bits to be set to indicate a stack full condition and the TOS indicator is set to 0. This condition is achieved by the time the packed data instruction is completed. Since the tag bits are distributed across many rename array entries in the buffer register 14 and also because the micro code does not implicitly know what entries are not already set, a set of special array writes are required to correctly set the tag bits (if it is not set already) before the packed data instruction completes.

That is, when the processor is operating in the floating point mode and the registers R0–R7 are in a floating point state, the tag bits can be either a 0 or a 1 depending on the content of the respective registers R0–R7. However, when the processor is operating in the packed data mode, the architecture requires that all of the tag bits be placed into the set state. In the prior practice, a fault detection mechanism was utilized to detect and initiate a fault condition if all of the tags were not in the set state. The fault condition halted the processor, flushed the instructions in the pipeline and issued a set of serialized instructions prior to permitting the packed data instruction to continue.

Since standard floating point flow initializes the stack for use by forcing the tag bits to the clear state, the tags will most likely not be in the full set state (at initialization or reset, the stack is emptied, so the TAGWORD initializes to all 0s). If the stack is not full during operation, one or more of the tags will be in the clear state. When the processor switches or transitions to the packed data mode from the floating point mode, a clear state in any one of the tag entries will cause a fault condition to be detected at which time the pipeline is flushed to reset the tags to the set state.

Accordingly, in most instances where there is a floating point to a packed data transition, a fault condition is detected and the pipeline is flushed to complete the serialization routine for setting the tag bits. Where this may not be a concern when the processor operates in one mode for a substantial period of time before transitioning, the problem is made more significant when mixed floating point/packed data code is present, which requires consistent switching back and forth between the two modes. The invention enhances the performance of a processor in such mixed code usage by reducing or eliminating the number of fault detections which will cause a pipeline flush.

In order to prevent a fault detection from being noted when transitioning from floating point to packed data mode of operation, the invention utilizes a tag status bit 23 which is also referred to as a tag incorrect (TINC) bit. The TINC bit is used to identify an inconsistency of the TAGWORD when transitioning between modes and to prevent the fault detection from halting the execution of the instruction.

In operation, the TINC bit 23 has a value of "0" or a "1", wherein TINC=1 indicates a tag incorrect status and TINC=0 indicates a tag correct status. The TINC bit is coupled to a TINC control unit 24, which is coupled to the tag modify unit 16. In the example, the TINC control unit 24 is shown as part of the mapping unit 15, however, unit 24 could readily reside elsewhere.

It is appreciated that the TAGWORD is architecturally visible to the system, but only when specifically requested for by the operating system. Internally, it is used to generate and/or correct floating point/packed data events. Therefore, although the TAGWORD is required to have all 1s for proper system requirements in the packed data mode, in actuality, the TAGWORD need not necessarily be at the all 1 state for packed data instruction operation. Accordingly, the present invention allows for packed data instructions to be executed in the packed data mode, even if the TAGWORD is not all set to 1. The TINC bit is used to identify the inconsistency when in the packed data mode. That is, the TINC=1 condition denotes that not all of the bits of the TAGWORD is set to 1, but still allows the execution of the packed data instruction (without flushing the instruction pipeline). The TINC=0 condition denotes constancy to the architectural requirement that all TAGWORD bits are set to 1 and allows the packed data instruction to proceed (as though the TINC bit did not exist).

Figure 2:
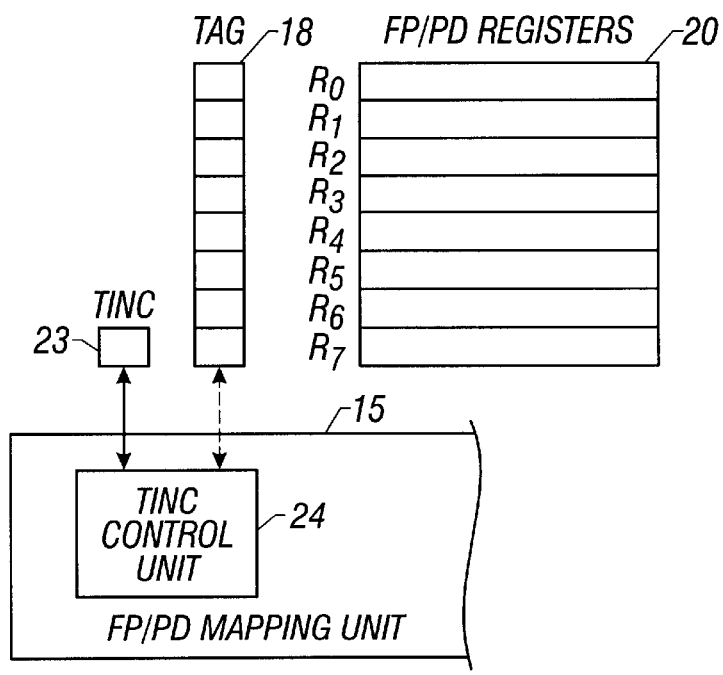
FIG. 2 is a generalized block schematic diagram showing the use of the TINC bit of the present invention.
Figure 3:
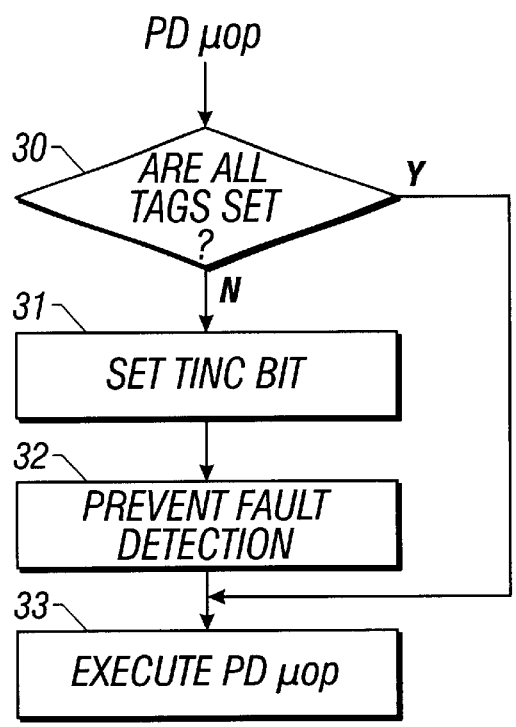
FIG. 3 is a flow diagram showing the decision process for setting the TINC bit.
Figure 4:
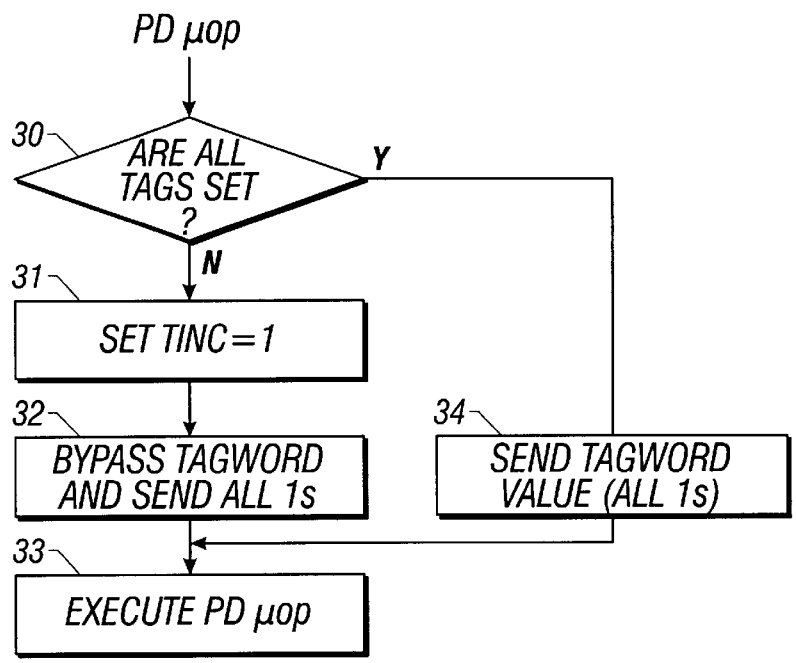
FIG. 4 is an alternative flow diagram for FIG. 3.

The operation of the TINC bit is better illustrated when viewed in reference to FIGS. 2–4. Where FIG. 1 shows one preferred embodiment, FIG. 2 shows a more general usage of the present invention. In FIG. 2, an illustrative set of floating point/packed data registers 20 is shown along with the tag bits, TINC bit and the TINC control unit. The registers 20 can be fixed registers, renamed registers or any other type of floating point registers which are also used for packed data operations. The tags 18 are associated with each of the register entries and the TINC bit 23 is associated with the TAGWORD, comprised of the tag bits.

As will be described, the TINC control unit 24 is utilized to control the value of the TINC bit and provide a substitute condition to the processor, which condition is to emulate an all tag set state when the TINC bit is set. The emulation can be achieved by generating a substitute TAGWORD which provides the expected TAGWORD value, bypass a fault condition and/or some other indication which indicates architecturally to the processor that the TAGWORD value is correct for executing a packed data instruction (even though the actual value of the TAGWORD would cause a fault condition to be generated by the processor).

FIG. 3 illustrates the instance when the processor is operating in the floating point mode. At initialization, such as on machine reset, the TINC bit is placed into a reset state (which in this instance has the value of "0"), along with the clearing of the stack entries. Assuming then that the processor had entered into a floating point state and executed floating point instructions, some or all of the registers R0–R7 will contain floating point data. The register(s) having a floating point entry will have the respective tag(s) set to 1. Therefore, when a transition is made to the packed data mode to execute a packed data instruction, the first packed data micro-operation (PD$\mu$op) causes a sequence of events illustrated in the flow chart of FIG. 3.

When the first PD$\mu$op is executed after transition from the floating point mode, the PD$\mu$op causes mapping unit 15 to check the TAGWORD to determine if all of the tags are in the set state. If all the tags are set, then the PD$\mu$op is executed. The TINC value remains 0 (See block 30). If all of the tags are set, the condition is equivalent to the normal condition for encountering a full stack when transitioning from the floating point state to the packed data state in the prior art. That is, since all of the tags are set (indicating a full stack), the TAGWORD is comprised of all 1s and a fault is not detected. Therefore the PD$\mu$op is executed.

However, if any of the tags are in the reset state, the present invention causes the TINC bit 23 to be set (block 31). In this instance to a 1 state. Again, the TINC=1 condition denotes an inconsistency between the desired and actual state for the TAGWORD. Normally in prior practice, this non-full stack condition causes a pipeline flush. However, in practicing the invention, if the TINC bit is set, the fault detection is prevented from occurring (block 32), and the PD$\mu$op is allowed to complete its execution (block 33).

As noted previously, a set TINC bit implies that there is an inconsistency between the architecturally required value for the TAGWORD and the actual value of the TAGWORD itself. In reference to a particular example where the TAGWORD is eight bits in length (a bit for each of the registers R0–R7), a TINC=1 state denotes that the TAGWORD has a value other than "11111111" (the notation in the quotes is used herein to represent an 8-bit binary number). When a TINC=1 condition exists, the system ignores the TAGWORD for executing the current PD$\mu$op. Also, during the condition when TINC=1, if an architectural request to read the TAGWORD is initiated, the TINC control unit responds with a "11111111" response instead of providing the actual TAGWORD value.

If the TINC bit is not set, then the TINC=0 condition implies that the value of the TAGWORD ("11111111", in this instance) is consistent with the system requirement, and the actual value of the TAGWORD is used. Accordingly, by using the TINC bit to bypass any inconsistencies of the TAGWORD, an expected response is indicated to the system. In one technique a response of "11111111" is generated to the system anytime a floating point to packed data transition is encountered. Therefore, any floating point to packed data transition will not result in a generation of a fault condition. FIG. 4 illustrates the specific implementation, where in block 34 shows the consistency of the TAGWORD and block 32 shows the bypass of the inconsistent TAGWORD when TINC=1.

Since the use of the TINC bit can create an inconsistency when transitioning from floating point to packed data modes, the inconsistency has to be considered when transitioning back to the floating point state from the packed data state. However, since floating point instructions routinely operate in a full or a non-full stack state, these floating point instructions already have the ability to set or clear the tag bit corresponding to its source or destination registers. For example, a floating point load instruction would automatically check that the destination register was empty, push data onto the stack and then set the corresponding tag bit. Thus, any empty entries (having a tag bit of 0) would be set to 1 when a floating point instruction loads that entry.

The packed data instructions operate in this manner also since these instructions operate on the same register set and the rename array. When the packed data instructions cause a register entry to be loaded, the respective tag bit is set. Thus, if a particular tag bit was 0, the loading of that register by a packed data operation now sets that tag bit to 1. When all of the empty entries are utilized, the tag bits are all set (TAGWORD="11111111"). At this point, the inconsistency no longer exists and the TINC bit is cleared (TINC=0). Generally, since packed data operations write to many registers, it is highly likely that the stack will be full and the TAGWORD made consistent while still in the packed data mode. Furthermore, to ensure that all of the registers are used, the packed data instructions can ensure that all of the register entries are utilized so that all of the tag bits are set. Once the TAGWORD is made consistent, the TINC bit is cleared and the system can view the TAGWORD as having the correct or actual value. Once this is achieved, then the packed data to floating point transition can occur normally, without an inconsistency of the TAGWORD.

In an alternative application, where the TINC bit is still set after the transition back to floating point mode, it is possible that the floating point instruction(s) may also fill some of the entries, which contributes to setting all of the tag bits. What is important is that the TINC bit be cleared (TINC=0) before the next operation desiring to clear individual TAGWORD bits. If there is a macro-instruction that clears all of the tag bits atomically, then the TINC bit can be cleared as well. For example, in the Intel Architecture Family an instruction, such as EMMS, performs this function of atomically clearing all tag bits, so that the TINC bit can be cleared as well, when EMMS is executed.

Since the writing to a register entry sets the tag bit, any tag bit inconsistency is corrected as the register is written into. However, a problem exists when a register entry is cleared while the TINC bit is set. The clearing of a specific register entry results in the respective tag bit being cleared to 0, but a 1 condition will still be noted due to the TAGWORD being bypassed. For example, if the TAGWORD has a value "10111011" and the TINC=1, the system infers a "11111111" condition for the TAGWORD. If at this point, the system desires to clear the least significant bit so that the expected result is "11111110", the TINC bit will need to be cleared (since the system expects a TAGWORD value other than "11111111"). The clearing of the TINC bit (TINC=0) will now cause the actual TAGWORD value to be used by the system. Thus, the system expects to see a TAGWORD value of "11111110", but in reality the TAGWORD value is "10111010". Since this inconsistency cannot occur, a fault condition is noted. Accordingly, there is a higher probability that a fault condition will be noted when clearing a register entry while the TINC bit is set.

A number of techniques can be developed to reduce this probability. Essentially, it is desirable to quickly clear the TINC bit once it is set. Stated differently, it is desirable to make the TAGWORD consistent to the all set condition as quickly as possible, so that the actual TAGWORD value correspond to the all set state, at which time TINC=0 and consistency is retained.

One technique for ensuring TAGWORD consistency to clear the TINC bit was described above, in which the instructions ensure that all entries are written into in packed data mode. FIG. 4 shows one variation of this approach. In FIG. 4, the eight registers are divided into dedicated registers for programming. In the example, three registers (R0, R6 and R7) are designated for use for floating point data operations. The remaining contiguous five registers (R1, R2, R3, R4, and R5) are designated for use for packed data operations. The programmer ensures that any packed data instruction will fully utilize all five registers (R1–R5). In this instance, registers R0, R6 and R7 are used for floating point data and their usage ensures that there is an entry at all times (so that their tag bits are set).

Thus, when transitioning from the floating point mode to the packed data mode, tag bits for R0, R6 and R7 are already set. Assuming that one or more of the tag bits for R1–R5 is clear, so that the TINC bit is set at this transition. If the packed data instruction ensures that all five registers R1–R5 are filled, then the TINC bit is cleared when the TAGWORD is all set. Thus, the inconsistency between the actual TAGWORD and the expected all set condition is guaranteed to be removed before transitioning back to a mode other than the packed data mode. In those small probability of instances where the TINC=1 when a transition occurs back to the floating point mode, a fault condition may still be required. However, the occurrences of these fault conditions are reduced significantly or even prevented, when the invention is practiced.

Figure 5:
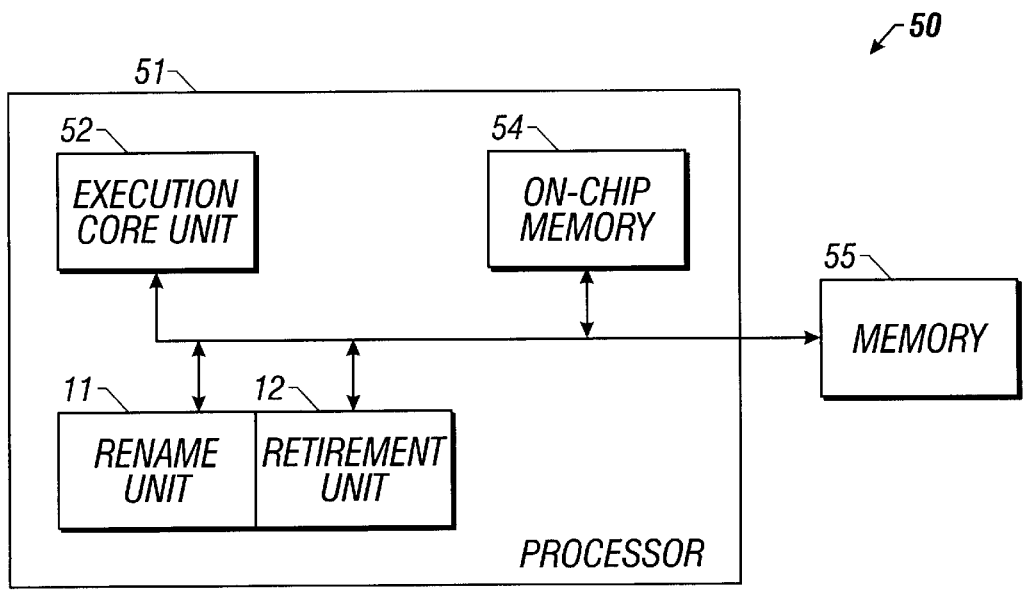
FIG. 5 is a system level diagram of a computer system which utilizes the present invention.

FIG. 5 illustrates one typical system implementation for the invention. A computer 50 is shown in which a processor 51 functions as a sole or one of a plurality of processors comprising the central processing unit (CPU) or units of the computer 50. Typically, the processor 51 is embodied in a single integrated circuit chip. The processor 51 includes an execution (processing) core 52, which has one or more execution units. A section of the processor is dedicated to include the rename unit 11 and the retirement unit 12. These units 11, 12 are shown coupled to the core 52. In this embodiment, the operating system (OS) and other programs are generally located in a memory 55.

The invention is practiced according to the description above to execute an instruction in the core 52. The memory 55 can be located on-chip (as shown by on-chip memory 54) or off-chip (as shown by off-chip memory 55). Typically, the on chip memory can be a cache memory or part of the main memory (RAM). The off-chip memory is typically comprised of main memory (but may include a cache), which also is coupled to other memory devices, such as to a disk storage medium. However, it is to be noted, that the invention can be configured in other ways to execute instructions operating on floating point and packed data.

Thus, a technique for enhancing performance for transitioning between floating point and packed data is described.

I claim:

1. An apparatus comprising:
   a plurality of registers to operate on data of a first mode when operating in a first state and to operate on data of a second mode when operating in a second state;
   a tag bit for each said register, in which each tag bit denotes if its corresponding register contains data when operating in the first state, but in which the tag bits of all of said registers are expected to be placed into a same state when operating in the second state;
   a tag status bit to identify if said tag bits are not all placed to the same state when transitioning from the first state to the second state;
   a control circuit coupled to said tag bit and said tag status bit to generate a substitute condition satisfying the expected placement of said tag bits to have all the same state when said tag status bit indicates an inconsistency between actual bit values of said tag bits and the expected same state for said tag bits; and
   said control circuit to remove the substitute condition once all of said tag bits are made consistent to the expected same state.

2. The apparatus of claim 1 wherein the first state is utilized to execute floating point instructions on floating point data and the second state is utilized to execute packed data instructions on packed data.

3. The apparatus of claim 2 wherein said registers function as a stack when executing floating point instructions on floating point data and in which said tag bit for a respective register is set when the register is loaded with floating point data, but is not set when the register does not contain valid floating point data; and said registers expected to have all of said tag bits set when operating on the packed data instructions.

4. The apparatus of claim 3 wherein said tag status bit is set if all of said tag bits are not set when executing a packed data instruction and the control circuit generates the substitute condition to emulate the setting of said tag bits.

5. The apparatus of claim 4 wherein said tag status bit is cleared when all of said tag bits are placed into a set state while executing the packed data instruction.

6. The apparatus of claim 5 wherein an instruction which clears one of the tag bits while said tag status bit is set results in a fault condition.

7. The apparatus of claim 6 wherein occurrences of the fault condition are minimized by filling all of said registers with packed data entry when executing a packed data instruction.

8. The apparatus of claim 6 wherein occurrences of the fault condition are minimized by having some of said registers dedicated to operating on floating point data operations and other of said registers dedicated to operating on packed data operations, in which programming ensures that all of said registers dedicated to packed data operations are always written into when executing packed data instructions.

9. A processor comprising:
an execution unit to execute processor instructions;
a plurality of registers coupled to said execution unit to operate on data of a first mode when operating in a first state and to operate on data of a second mode when operating in a second state;
a tag bit for each said register, in which each tag bit denotes if its corresponding register contains data when operating in the first state, but in which the tag bits of all of said registers are expected to be placed into a same state when operating in the second state;
a tag status bit to identify if said tag bits are not all placed to the same state when transitioning from the first state to the second state;
a control circuit coupled to said tag bit and said tag status bit to generate a substitute condition satisfying the expected placement of said tag bits to have all the same state for said execution unit, when said tag status bit indicates an inconsistency between actual bit values of said tag bits and the expected same state for said tag bits; and
said control circuit to remove the substitute condition once all of said tag bits are made consistent to the expected same state.

10. The processor of claim 9 wherein said execution unit executes floating point instructions on floating point data for the first state and said execution unit executes packed data instructions on packed data for the second state.

11. The processor of claim 10 wherein said registers function as a stack when executing floating point instructions on floating point data and in which said tag bit for a respective register is set when the register is loaded with floating point data, but is not set when the register does not contain valid floating point data; and said registers expected to have all of said tag bits set when operating on the packed data instructions.

12. The processor of claim 11 wherein said tag status bit is set if all of said tag bits are not set when executing a packed data instruction and the control circuit generates the substitute condition to emulate the setting of said tag bits.

13. The processor of claim 12 wherein said tag status bit is cleared when all of said tag bits are placed into a set state while executing the packed data instruction.

14. The processor of claim 13 wherein an instruction which clears one of the tag bits while said tag status bit is set results in a fault condition.

15. The processor of claim 14 wherein occurrences of the fault condition are minimized by filling all of said registers with packed data entry when executing a packed data instruction.

16. The processor of claim 14 wherein occurrences of the fault condition are minimized by having some of said registers dedicated to operating on floating point data operations and other of said registers dedicated to operating on packed data operations, in which programming ensures that all of said registers dedicated to packed data operations are always written into when executing packed data instructions.

17. A computer system comprising:
a processor to execute processor instructions;
said processor including:
a plurality of registers coupled operate on data of a first mode when operating in a first state and to operate on data of a second mode when operating in a second state;
a tag bit for each said register, in which each tag bit denotes if its corresponding register contains data when operating in the first state, but in which the tag bits of all of said registers are expected to be placed into a same state when operating in the second state;
a tag status bit to identify if said tag bits are not all placed to the same state when transitioning from the first state to the second state;
a control circuit coupled to said tag bit and said tag status bit to generate a substitute condition satisfying the expected placement of said tag bits to have all the same state for processor execution, when said tag status bit indicates an inconsistency between actual bit values of said tag bits and the expected same state for said tag bits; and
said control circuit to remove the substitute condition once all of said tag bits are made consistent to the expected same state; and
a memory coupled to said processor to store the processor instructions.

18. The computer system of claim 17 wherein said processor executes floating point instructions on floating point data for the first state and said processor executes packed data instructions on packed data for the second state.

19. The computer system of claim 18 wherein said registers function as a stack when executing floating point instructions on floating point data and in which said tag bit for a respective register is set when the register is loaded with floating point data, but is not set when the register does not contain valid floating point data; and said registers expected to have all of said tag bits set when operating on the packed data instructions.

20. The computer system of claim 19 wherein said tag status bit is set if all of said tag bits are not set when executing a packed data instruction and the control circuit generates the substitute condition to emulate the setting of said tag bits.

21. The computer system of claim 20 wherein said tag status bit is cleared when all of said tag bits are placed into a set state while executing the packed data instruction.

22. The computer system of claim 21 wherein an instruction which clears one of the tag bits while said tag status bit is set results in a fault condition.

23. The computer system of claim 22 wherein occurrences of the fault condition are minimized by filling all of said registers with packed data entry when executing a packed data instruction.

24. The computer system of claim 22 wherein occurrences of the fault condition are minimized by having some of said registers dedicated to operating on floating point data operations and other of said registers dedicated to operating on packed data operations, in which programming ensures that all of said registers dedicated to packed data operations are always written into when executing packed data instructions.

25. A method comprising:
assigning a tag bit for each of a plurality of registers, in which each tag bit denotes if its corresponding register contains data when operating in a first state, but in which the tag bits of all of said registers are expected to be placed into a same state when operating in a second state;
executing a first state instruction in the first state;
transitioning to the second state to execute a second state instruction;
checking a status of the tag bits to determine if the tag bits are all in the expected same state;

setting a tag status bit if the tag bits are not all in the expected same state;

transitioning to the second state if the tag status bit is not set and if the tag status bit is set, substituting a condition which emulates the expected same state for the tag bits to prevent a fault condition from being generated; and executing the second state instruction.

26. The method of claim 25 further including the resetting of the tag status bit when all of the tag bits are placed into the expected same state.

27. The method of claim 26 further including filling all registers which do not contain data when executing the second instruction, to ensure that all tag bits are placed into the expected same state to reset the tag status bit.

28. A method comprising:

assigning a tag bit for each of a plurality of registers, in which each tag bit denotes if its corresponding register contains data when operating in a floating point mode, but in which the tag bits of all of said registers are expected to be placed into set state when operating in packed data mode;

executing a floating point instruction in the floating point mode;

transitioning to the packed data mode to execute a packed data instruction;

checking a status of the tag bits to determine if the tag bits are all set;

setting a tag status bit if the tag bits are not all in the set state;

transitioning to the packed data mode if the tag status bit is not set and if the tag status bit is set, substituting a condition which emulates set state for the tag bits to prevent a fault condition from being generated; and executing the packed data instruction.

29. The method of claim 28 further including the resetting of the tag status bit when all of the tag bits are set.

30. The method of claim 29 further including filling all registers which do not contain data when executing the second instruction, to ensure that all tag bits are set to reset the tag status bit.

* * * * *